United States Patent [19]

Weber et al.

[11] Patent Number: 5,370,378
[45] Date of Patent: Dec. 6, 1994

[54] WORK HOLDING SYSTEM

[75] Inventors: Jonathan T. Weber; Edward J. Peter, both of Cincinnati, Ohio

[73] Assignee: Positrol, Inc., Cincinnati, Ohio

[21] Appl. No.: 120,730

[22] Filed: Sep. 13, 1993

[51] Int. Cl.$^5$ .............................................. B23Q 3/10
[52] U.S. Cl. .................................................. 269/309
[58] Field of Search .................. 269/309, 310, 56; 29/464, 563, 559, 33 P; 198/345

[56] References Cited

U.S. PATENT DOCUMENTS

| | | | |
|---|---|---|---|
| 4,390,172 | 6/1983 | Gotman | 269/309 |
| 4,489,926 | 12/1984 | Blatrix | 269/309 |
| 4,575,062 | 3/1986 | Mudge et al. . | |
| 4,586,702 | 5/1986 | Chambers | 269/310 |
| 4,643,410 | 2/1987 | Mudge et al. | |
| 4,688,974 | 8/1987 | Wright et al. | 269/309 |
| 4,723,877 | 2/1988 | Erickson . | |
| 4,735,671 | 4/1988 | Stoffel et al. | 269/310 |
| 4,838,533 | 6/1989 | Buchler | 269/310 |
| 5,190,272 | 3/1993 | Zika et al. | 269/309 |

OTHER PUBLICATIONS

Polygon Systems, Stoffel Polygon Systems, P.O. Box 475, 199 Marbledale Road, Tuckahoe, N.Y. 10707 (8 pgs.).

*Primary Examiner*—Robert C. Watson
*Attorney, Agent, or Firm*—Frost & Jacobs

[57] ABSTRACT

A work holding system for repeatably holding work pieces in a very precise position and orientation for machining operations or the like to be performed thereon. The work holding system comprises a cooperating receiver and pallet assembly. The receiver is mounted on a suitable surface. A work piece is mounted on the pallet. A cooperating pair of matable male and female polygons are provided, one mounted in the receiver and the other mounted in the pallet. The pallet and the receiver have cooperating, abuttable, annular surfaces. The pallet is mountable on the receiver with the male and female polygons mated to repeatably provide highly precise concentricity or centering of the work piece and the pallet with respect to the receiver. The abutment of the annular surfaces of the receiver and pallet assures highly precise, repeatable flatness or parallelism of the pallet with respect to the receiver so that the receiver axis and the centered pallet axis are coaxial. The mating of the male and female polygons repeatably and precisely properly orients the work piece about the axis of the receiver. A clamping assembly is provided to releasably clamp the work piece carrying pallet to the carrier, when the pallet is properly mounted on the carrier.

7 Claims, 6 Drawing Sheets

WORK HOLDING SYSTEM

TECHNICAL FIELD

The invention relates to a work holding system for a machining center or the like, and more particularly to such a system comprising a pallet and a receiver provided with cooperating male and female polygons and cooperating abutment surfaces to provide improved repeatable clocking, concentricity or centering, and flatness or parallelism.

BACKGROUND ART

The present invention relates to the proper positioning and orienting of work pieces at a work station of any appropriate operation requiring precise positioning of the work piece. Examples include machining, inspection, balancing, and assembly operations. For purposes of an exemplary showing the invention will be described in terms of a machining operation in a machining center or the like, where machine operations are performed on the work piece. That the work piece be properly positioned and oriented to receive the machining operation is, of course, imperative. It is well known that properly positioning, orienting and securing the work piece at a work station in many instances can take far longer than the machining operation, itself. Prior art workers have devised many means for accomplishing this task. Of particular note is the development of work holding means comprising a receiver and a carrier or pallet. The receiver is mounted on an appropriate surface, either located at the work station of the machining center, or shiftable to such a position. The work piece upon which one or more machining operations are to be performed is affixed to the pallet. The pallet, carrying the work piece, is properly mounted on the receiver and is firmly clamped thereto.

The mating of and clamping of the work piece carrying pallet to the receiver is intended to assure proper positioning and orientation of the work piece at the work station. U.S. Pat. Nos. 4,575,062 and 4,643,410 illustrate work holding systems of this general type, which have been in use for many years. For purposes of explanation, let it be assumed that the surface to which the receiver is attached is a horizontal surface. The receiver and the pallet are provided with circular rings having abuttable horizontal surfaces provided with radially oriented teeth. The teeth of the pallet and receiver rings interengage. Interengagement of these radial teeth on the pallet and receiver rings enables achievement of precise concentricity or centering of the pallet with respect to the receiver. Means are also provided so that the pallet is properly horizontally seated with respect to the receiver, often referred to as "flatness" or "parallelism" of the pallet with respect to the receiver. This assumes that the axis of the pallet is vertical. This causes the centered vertical axes of the receiver and pallet to be coaxial. The interengaged teeth of the toothed rings of the pallet and receiver provided means for properly orienting the work piece about the axis of the receiver (frequently called clocking). These factors result in the precise and proper repeatable positioning of the work piece at the work station of the machining center. The degree of repeatable precision achieved is limited by the degree of precision with which the interengaging teeth can be formed.

The present invention is based upon the discovery that a work holding system comprising a pallet and a receiver can be provided which can achieve a degree of repeatable precision with respect to concentricity or centering, flatness or parallelism, and clocking, hitherto unobtainable. For example, clocking can be repeatably achieved within about one arc second. Flatness or parallelism can be repeatably achieved within about 0.0001 inch. Concentricity or centering can be repeatably achieved within about 0.0002 inch. The pallet and receiver incorporate cooperating male and female polygons and cooperating annular abutment surfaces.

The pallet and receiver of the work holder system of the present invention can be of relatively simple construction. Any appropriate means can be used to clamp the pallet to the receiver.

DISCLOSURE OF THE INVENTION

In accordance with the invention there is provided a work holding system for repeatably holding work pieces in a very precise position and orientation for machining operations to be performed thereon. The work holding system comprises a receiver and a pallet. Means are provided to mount the receiver on an appropriate surface. Means are also provided by which a work piece is properly positioned and mounted on the pallet. A cooperating pair of matable male and female polygons are provided. The male polygon is provided with flat reliefs at those positions wherein there is initial contact between the male polygon and the female polygon during the mating thereof. One of the male and female polygons is mounted in the receiver and the other one of the male and female polygons is mounted in the pallet. The pallet and the receiver have planar, cooperating, abuttable, annular surfaces. The pallet is mountable on the receiver and air under pressure is provided to assure that the polygons and the cooperating abutting surfaces are free of chips or other foreign material. The male and female polygons mate to provide highly precise concentricity or centering of the work piece and the pallet with respect to the receiver. The abutment of the annular surfaces of the receiver and the pallet assures the flatness or parallelism of the pallet with respect to the receiver so that their respective axis are parallel and are indeed coaxial by virtue of the centering. The mating of the male and female polygons additionally properly orient the work piece about the axis of the receiver. Once properly mated, the pallet and the receiver are releasably clamped together by a clamping assembly. Means are provided to prevent clamping should the proper flatness or parallelism not be achieved.

DETAILED DESCRIPTION OF THE INVENTION

Figure 1:
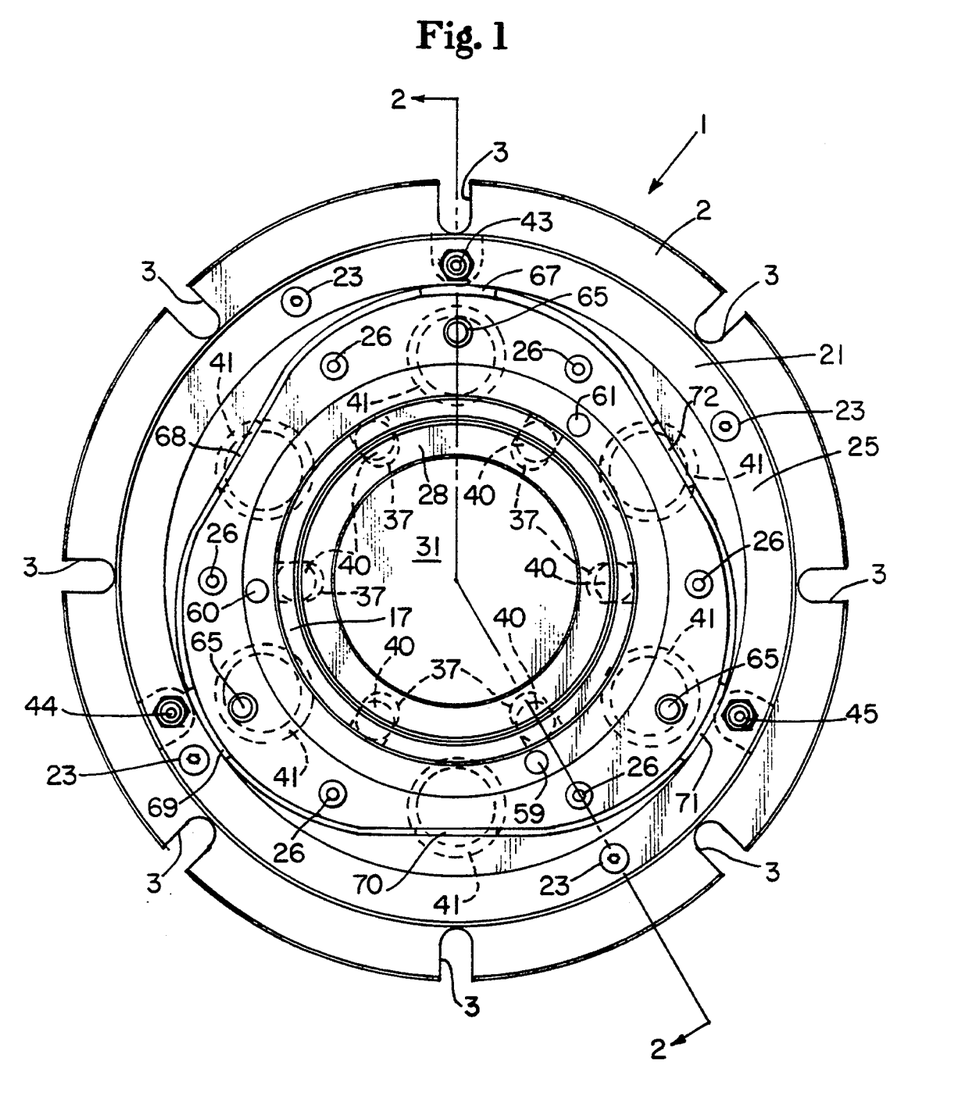
FIG. 1 is a top plan view of the receiver of the work holding system of the present invention.
Figure 2:
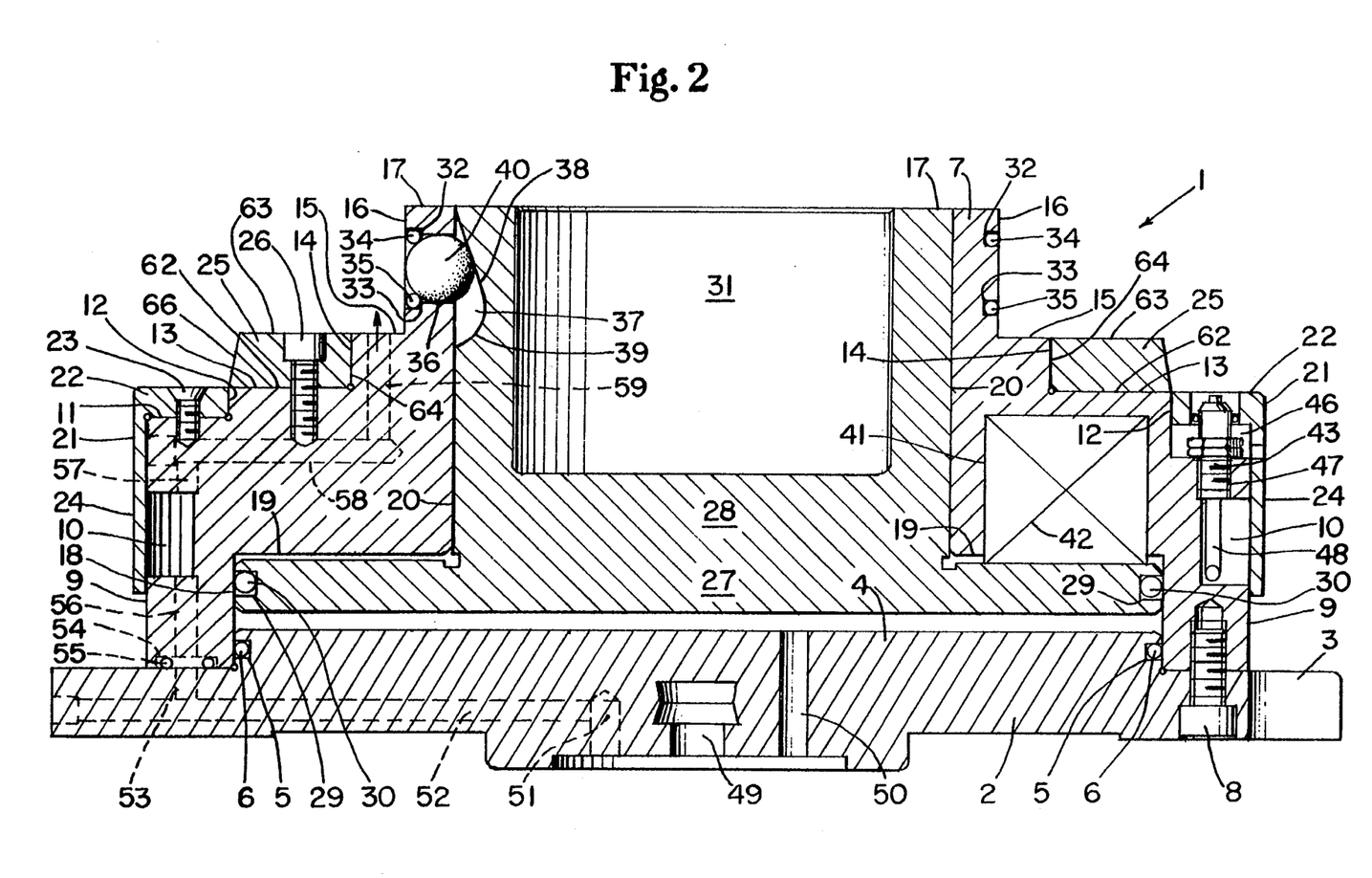
FIG. 2 is a cross sectional view of the receiver taken along section line 2—2 of FIG. 1.

In the Figures, like parts have been given like index numerals throughout. Reference is first made to FIGS. 1 and 2 wherein the receiver part of the work holding system of the present invention is shown. The receiver is generally indicated at 1 and comprises an adapter flange 2. The adapter flange 2 is provided with a plurality of notches 3, evenly spaced about its periphery (see FIG. 1). By means of these notches 3, the receiver adapter flange can be bolted to an appropriate support (not shown). As is well known in the art, the support may take any appropriate form including a rotating table, a fixed table, a spindle, or the like.

The adapter flange 2 has a central cylindrical raised portion 4. The peripheral surface of the raised portion 4 has an annular notch 5 formed therein, to receive a resilient sealing ring 6.

The adapter flange 2 supports a cylinder housing 7 which is affixed thereto by a plurality of bolts evenly spaced about the adapter flange 2 and the cylinder housing 7, and one of which is shown at 8 in FIG. 2. The cylinder housing has an exterior cylindrical surface 9 having a large annular groove 10 formed therein. The cylindrical outer surface 9 of the cylinder housing 7 terminates in a horizontal annular surface 11. The annular surface 11, in turn, is followed by a vertical cylindrical surface 12 leading to another horizontal annular surface 13. The annular surface 13 surrounds a cylindrical vertical surface 14 terminating in a horizontal annular surface 15. The cylinder housing 7 is provided with a final upstanding cylindrical surface 16 terminating in the annular top surface 17. Interiorly, the cylinder housing 7 has a lower cylindrical interior surface 18 sealingly engaged by the resilient ring 6 of adapter flange 2. The cylindrical interior surface 18 leads to an annular horizontal surface 19, terminating in a vertical cylindrical interior surface 20, which extends to the top surface 17. The annular exterior surface 11 of cylinder housing 7 supports a cover ring 21 having an annular portion 22 overlying exterior surface 11 of cylinder housing 7. The cover ring 21 is affixed to the cylinder housing 7 by a plurality of bolts 23, one of which is shown in FIG. 2 and all of which are shown in FIG. 1. The cover ring 21 has a downwardly depending annular skirt 24 which extends downwardly along the outer surface 9 of the cylinder housing 7. It will be noted that the annular skirt 24 closes the annular notch 10, converting it to an annular chamber. The purpose of chamber 10 will be apparent hereinafter.

The annular surface 13 of cylinder housing 7 supports a male polygon 25. The polygon 25 is affixed to the cylinder housing surface 13 by a plurality of machine screws 26, one of which is shown in FIG. 2, and all of which are shown in FIG. 1. The polygon 25 has a slight force fit with respect to the cylindrical surface 14 of cylinder housing 7. Male polygon 25 will be described in greater detail hereinafter.

A piston 27 is slidably located within cylinder housing 7. The piston 27 is of a diameter such as to just nicely fit within the interior cylindrical surface 18 of cylinder housing 7. The piston 27 has a cylindrical shank portion 28 having an exterior diameter such as to just nicely fit within the cylindrical interior surface 20 of cylinder housing 7. The piston 27 and its shank portion 28 are shiftable between a lowermost position shown in FIG. 6 and an uppermost position illustrated in FIG. 2. Piston 27 has an annular peripheral notch 29 formed therein, for receipt of a sealing ring 30. It will be noted that the shank portion 28 of piston 27 is hollow, to the extent that it has a cylindrical recess 31 formed therein.

Near its uppermost end 17, the cylinder housing 7 has a pair of annular notches 32 and 33 adapted to receive O-rings 34 and 35, respectively. Evenly spaced about the upper portion of cylinder housing 7 there are a plurality of bores 36 located between annular notches 32 and 33. The number of bores 36 is not limiting. In FIG. 1, six such bores are shown. In FIG. 2, one of the bores 32 is illustrated. At the position of each bore 36 in cylinder housing 7, the piston shank 28 has a depression 37 formed therein. As is most clearly shown in FIG. 2, each depression 37 has a downwardly and inwardly sloping portion 38 and a rounded portion 39. Each bore 36 in cylinder housing 7 is so sized as to receive a large ball bearing 40 therein. Each ball bearing 40 is shiftable within its bore 36 and is retained therein by its respective one of the depressions 37 in piston shank 28 and by the O-rings 34 and 35. It will be noted that when the piston 27 is in its uppermost position, as illustrated in FIG. 2, the ball bearings 40 extend partway into their respective depressions 37 and do not extend beyond the cylindrical outer surface 16 of cylinder housing 7. If the piston 27 is shifted downwardly, the surface 38 of each piston shank depression 37 will cause its respective ball bearing 40 to achieve a position wherein it extends partway beyond the exterior surface 16 of cylinder housing 7. It would be within the scope of the present invention to replace depressions 37 with a single annular notch having the same cross sectional configuration.

The cylinder housing 7 has a number of large cylindrical sockets 41 formed therein. Six such sockets are illustrated in broken lines in FIG. 1. One of the sockets 41 is shown in FIG. 2. Each of the sockets 41 forms an opening in the horizontal annular surface 19. A heavy duty spring is mounted in each of the sockets. Such a heavy duty spring is diagrammatically indicated at 42 in FIG. 2. One end of spring 42 abuts the closed end of socket 41, while the other end of spring 42 abuts the top annular surface of piston 27. As a consequence of this, all six of the heavy duty springs 42 bear against piston 27 and urge it to its lowermost position against adapter flange 2.

The receiver 1 is provided with three limit switches, most clearly shown in FIG. 1 at 43, 44 and 45. The limit switch 43 is also illustrated in FIG. 2. Limit switch 43 is located in a recess 46 formed in the surface 11 of cylinder housing 7. The limit switch 43 extends through a bore 47 which communicates with annular chamber 10. Electrical connections 48 from limit switch 43 pass through the chamber 10 and, by appropriate passages in cylinder housing 7 and adapter flange 2 (not shown), the electrical connections 48 passes out of the adapter flange through a wiring cavity 49. It will be understood that the other two limit switches 44 and 45 are identical to limit switch 43 and are identically mounted with respect to receiver 1.

The adapter flange 2 has a bore 50 extending therethrough through which pressurized air is introduced beneath piston 27 to shift the piston to its upward position against the action of springs 42. When pressurized air is not introduced through passage 50, the piston 27 will return to its lower position by virtue of the action of springs 42.

Adapter flange 2 is provided with a second pressurized air passage 51 which connects to a passage 52 leading to a passage 53. The passage 53 opens through the annular surface of adapter flange 2, upon which cylinder housing 7 rests. Cylinder housing 7 has a circular depression 54 formed therein containing an O-ring 55 which makes a seal with the adapter flange 2. The circular depression 54 is connected by passage 56 to annular chamber 10. Annular chamber 10 is connected by passages 57 and 58 to an upwardly directed passage 59 opening in the annular exterior surface 15 of cylinder housing 7. The passage 59 is shown in FIG. 1. Two other identical passages are shown at 60 and 61 in FIG. 1. The passages 59, 60 and 61 are evenly spaced about the annular surface 15. The passages 60 and 61 are connected to the chamber 10 in a manner substantially identical to that just described for passage 59. These passages are also intended to carry pressurized air, and their purpose will be described hereinafter.

Figure 3:
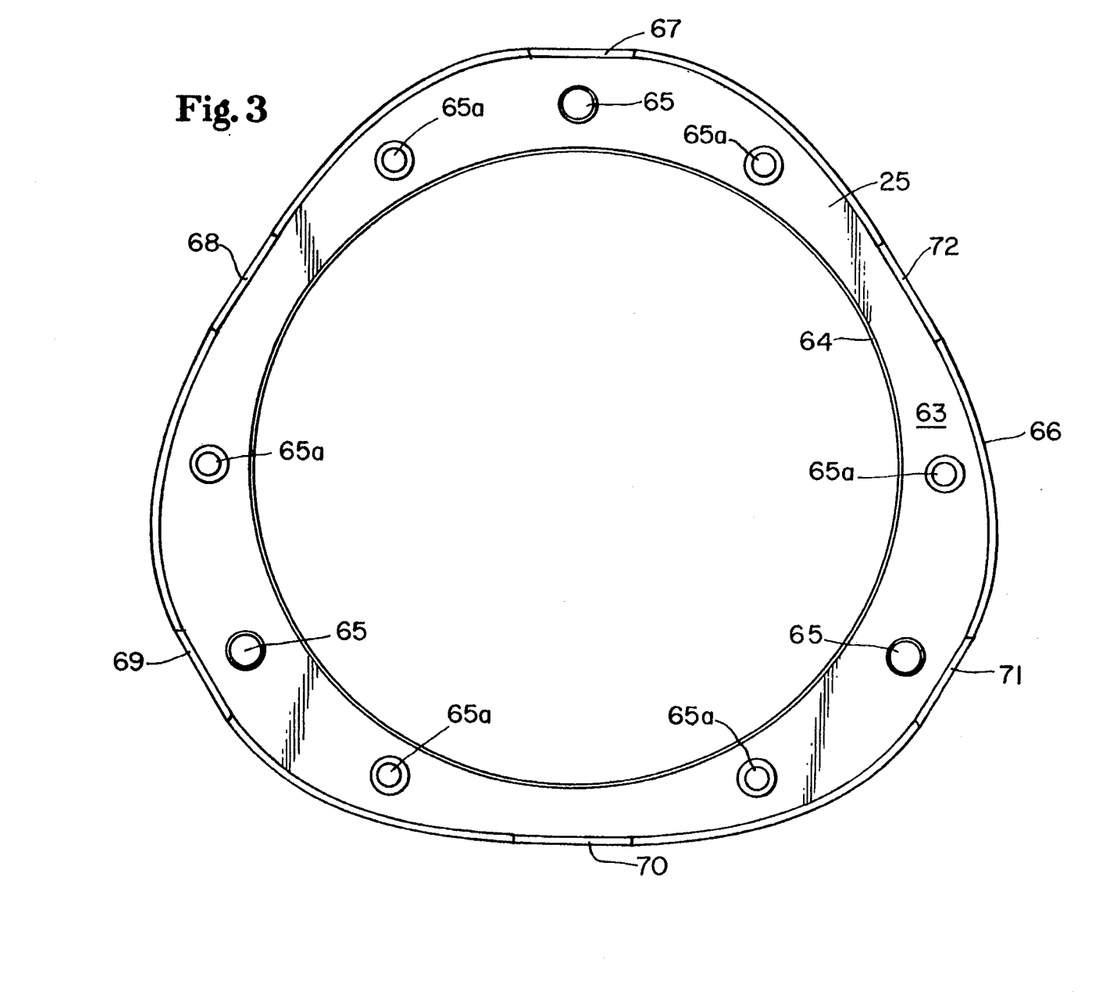
FIG. 3 is a top plan view of the male polygon of the receiver.

The male polygon 25 is illustrated in detail in FIG. 3. The male polygon 25 has planar bottom and top surfaces 62 and 63 (see FIG. 2). The top surface 63 comprises the horizontal, annular, abutment surface of the receiver, to be further described hereinafter. The polygon 25 has a cylindrical inner surface 64 which engages the cylindrical outer surface 14 of cylinder housing 7 with a force fit. In view of this force fit, polygon 25 is provided with three threaded bores 65 evenly spaced thereabout. The threaded bore 65 are adapted to accept set screws, by means of which the polygon 25 may be removed from cylinder housing surfaces 13 and 14. The polygon is provided with counter sunk bores 65a adapted to receive the bolts 26 by which the polygon 25 is affixed to the surface 13 of cylinder housing 7. The outer surface 66 of the male polygon slopes outwardly and downwardly (as viewed in FIGS. 1 and 2) at an appropriate angle. Finally, to assure a smooth and proper engagement and mating of the male polygon with the female polygon (to be described hereinafter), the sloped and curved peripheral surface 66 of the male polygon is provided with flat reliefs at those positions at which the male polygon 25 first engages the female polygon. This precludes a slight rocking or rotating motion of the male polygon as it enters the female polygon, greatly improving repeatability of clocking.

Figure 4:
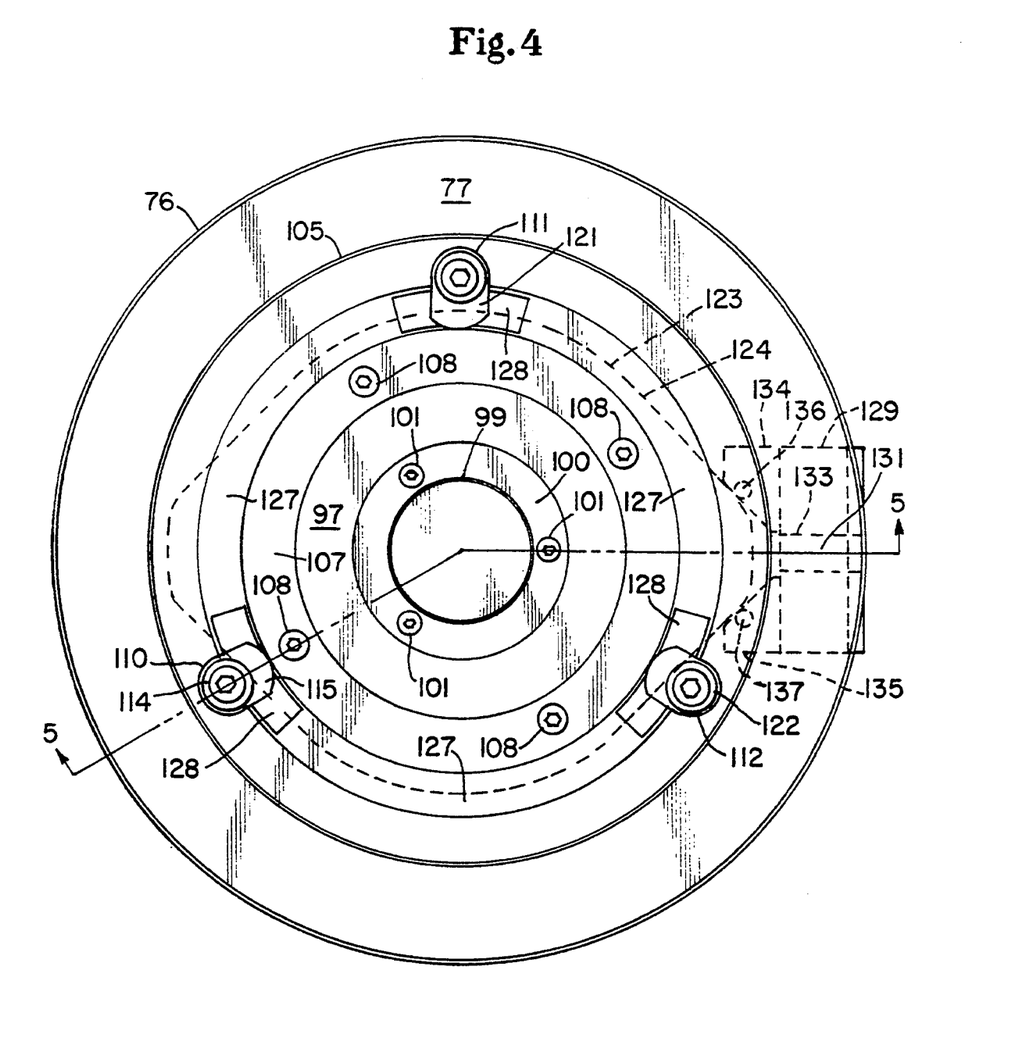
FIG. 4 is a fragmentary top plan view of the pallet of the work holding system of the present invention, with a work piece and a work piece locator illustrated in broken lines.
Figure 5:
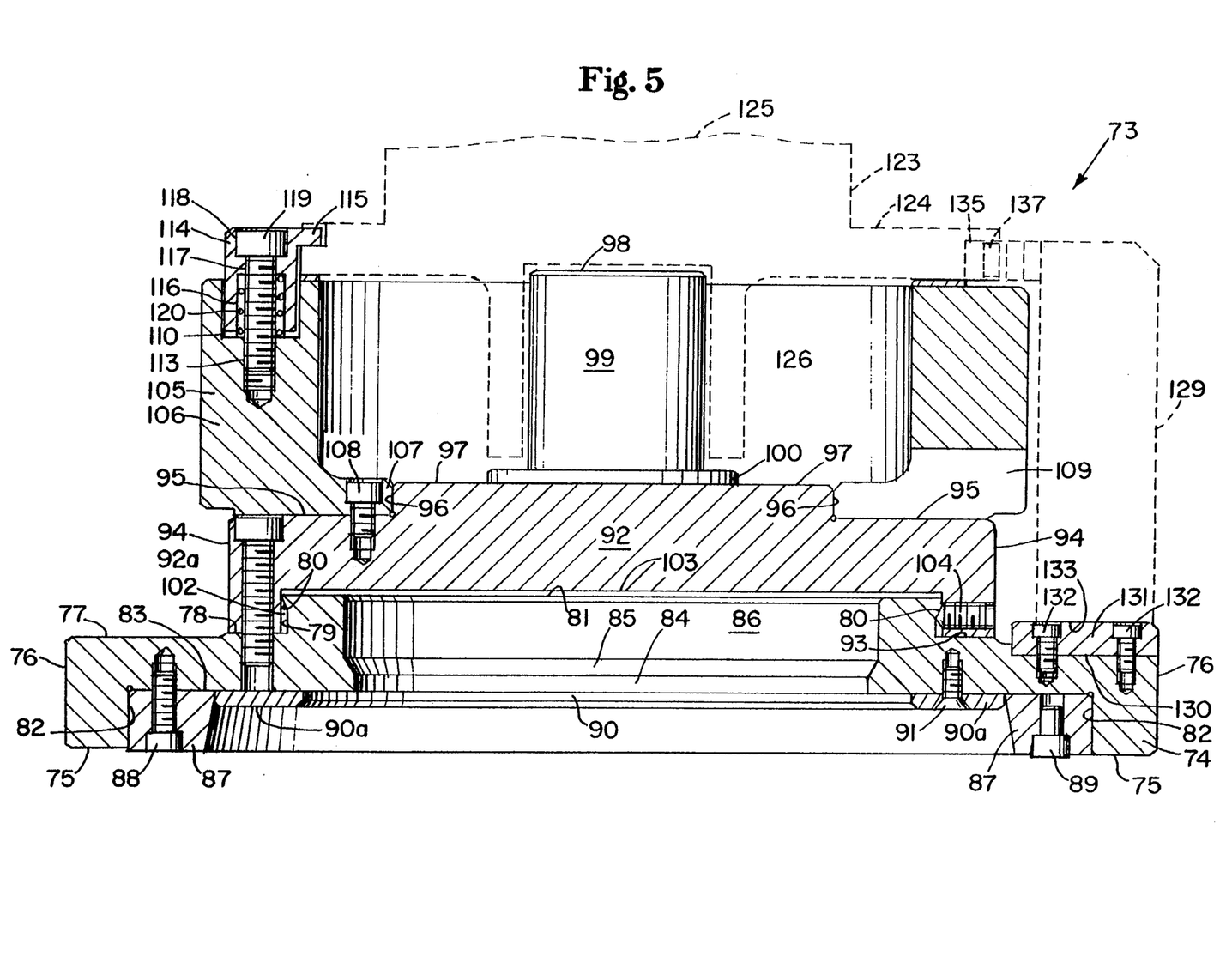
FIG. 5 is a cross sectional view taken along section line 5—5 of FIG. 4.

At this point, the receiver 1 of the work holding system of the present invention has been described in detail. Reference is now made to FIGS. 4 and 5 with respect to which the work holder or pallet will be described. The pallet, generally indicated at 73, is best shown in FIGS. 4 and 5. The pallet 73 comprises an annular adapter 74 which serves as a base for the structure. The adapter 74 has a planar, annular bottom surface 75, a cylindrical peripheral surface 76, a horizontal annular upper surface 77 leading to a slightly more elevated additional horizontal annular surface 78. The annular surface 78 leads to an upstanding cylindrical surface 79 which is surmounted by an annular upwardly and outwardly sloping surface 80. The surface 80 is surmounted by the uppermost annular surface 81 of adapter 74.

The interior surface structure of adapter 74 comprises a lower annular cylindrical surface 82 leading to an annular horizontal surface 83. At its innermost edge, the annular horizontal surface 83 terminates in an upwardly directed cylindrical surface 84 leading to an upwardly and outwardly sloping annular surface 85. The surface 85 leads to a vertical cylindrical surface 86 which extends to the top annular surface 81.

Within the adapter 74, and adjacent its inner surfaces 82 and 83, there is a female polygon 87 adapted to mate with the male polygon 25 of receiver 1. Female polygon 87 is attached to adapter surface 83 by a plurality of machine screws similar to the machine screws 26 used to attach the male polygon 25 to the cylinder housing 7 (see FIGS. 1 and 2). One of these machine screws for female polygon 87 is shown in FIG. 5 at 88. The outer peripheral surface of the female polygon has a force fit with respect to surface 82 of pallet adapter. As a result, the female polygon is provided with threaded bores (not shown) equivalent to threaded bores 65 of the male polygon for set screws used in removal of the female polygon from the pallet. The inner peripheral surface of the female polygon, as viewed in FIG. 5, slopes upwardly and inwardly at an appropriate angle.

In FIG. 5, the female polygon 87 is also illustrated as having a rest button 89 mounted therein. When the pallet 73 is mated with and clamped to the receiver 1, rest button 89 will cooperate with that one of limit switches 43, 44 or 45 with which it is aligned. It will be understood that polygon 87 will support two additional rest buttons (not shown) to cooperate with the remaining two of the limit switches.

A replaceable, annular, wear ring 90 is mounted on the annular adapter surface 83 within the female polygon 87. Wear ring 90 is attached to the adapter surface 83 by a plurality of machine screws, one of which is shown at 91 in FIG. 5. Wear ring 90 provides the horizontal, annular, abutment surface 90a of the pallet, adapted to cooperate with top surface 63 of male polygon 25, as set forth hereinafter.

Adapter 74 is surmounted by and supports a work holding member 92, attached thereto by a plurality of bolts, one of which is shown at 92a. Work holding member 92 has an annular, planar bottom surface 93 and an outermost, cylindrical, peripheral surface 94. Cylindrical surface 94 extends upwardly to a horizontal annular surface 95. Annular surface 95 surrounds a second cylindrical surface 96 which terminates upwardly in a second horizontal annular surface 97.

In the embodiment illustrated, the work holding member 92 is provided with a central, upstanding, cylindrical work engaging portion 98. The work engaging portion 98 is surrounded by a thin expandable metallic sleeve 99 which, at its lower end, is provided with a lateral flange 100 by which it is affixed to the work holding member 92 by a plurality of machine screws 101. The work engaging portion 98 and the thin expandable metallic sleeve 99 comprise a hydraulic arbor, as is well known in the art.

The work holding member 92 has an interior cylindrical wall 102 and a horizontal upper surface 103. The pallet adapter 74 and the work holding member 92 are centered with respect to each other by a series of evenly spaced set screws 104 threadedly engaged in the work holding member 92 and abutting the surface 80 of adapter 74.

The pallet 73 is completed by the provision of a work stop/support 105. The work stop/support 105 comprises an annular wall portion 106 provided with an inwardly extending flange portion 107 near its lower end. The lower end of wall portion 106 and flange portion 107 of work stop/support 105 is adapted to rest upon surface 95 of work holding member 92 and to abut the cylindrical surface 96 thereof. The flange portion 107 is affixed to surface 95 by machine screws 108. The flange portion 107 has a plurality of slots 109 formed therein to permit escape of chips and coolant.

The annular wall portion 106 of work piece stop/support 105 is provided with three sockets 110, 111 and 112, evenly spaced about its upper surface. The socket 110 is clearly shown in FIG. 5. The socket 110 has a threaded central bore 113 of lesser diameter. The socket 110 is intended to receive a clamp element 114. The clamp element 114 has a cylindrical body having an outer diameter such that it is just nicely received within socket 110. The clamp element 114 has a clamping nose 115 adapted to engage and clamp a work piece.

Clamp element 114 has a central axial bore comprising a first portion 116 extending upwardly from the clamp element bottom and terminating in a second portion 117 of lesser diameter. The portion 117, in turn, terminates in a countersink portion 118. The clamp element 114 is affixed within socket 110 by a headed bolt 119. The headed bolt passes through bore portions 118, 170 and 116, and is threadedly engaged in the bore 113 within the wall portion 106 of work piece stop/support 105. A compression spring 120 extends about bolt 119 within bore portion 116. One end of compression spring 120 abuts the shoulder formed within clamp element 114 between bore portions 116 and 117. The other end of compression spring 120 abuts the bottom of socket 110. Thus, clamp element 114 is constantly urged against the head of bolt 119. As is shown in FIG. 4, socket 111 is provided with a clamp element 121, identical to clamp element 114. Similarly, socket 112 is provided with a clamp element 122, identical to clamp element 114.

The receiver 1 and pallet 73 of the work holding system of the present invention having been described in detail, the manner of their use will next be described. As indicated above, the adapter flange 2 of the receiver 1 is affixed to an appropriate surface in association with a machining center. Such a surface can be a fixed table, a rotatable table, a spindle or the like. A work piece upon which machining operations are to be performed is affixed to the pallet 73. An exemplary work piece is shown in broken lines at 123 in FIGS. 4 and 5. The exemplary work piece 123 is illustrated as having a plate-like base 124. The body 125 of the work piece 123 is fragmentarily shown in FIG. 5 extending upwardly from the base 124. The particular exemplary work piece 123 is also shown having a hollow, downwardly depending, cylindrical shank 126.

The work piece 138 is placed upon the work stop/support 105 so that the work piece base 124 rests upon the supporting surfaces 127 and 128 of the work piece stop/support 105. It will be noted that the hollow, downwardly depending, cylindrical shank 126 of the work piece 123 receives and surrounds the work engaging portion 98 of the work holding member 92 and the thin expandable sleeve 199 (i.e. the hydraulic arbor 98/99).

Prior to clamping the work piece 123 on pallet 73, it may be necessary to locate or "clock" the work piece 123 with respect to the pallet 73. If this is the case, the pallet 73 may be provided with a removable work piece locator shown in broken lines at 129. As is most clearly shown in FIG. 5, the annular surface 77 of adapter 73 may be provided with a keyway 130. An upstanding key 131 is affixed in keyway 130 by bolts 132. The removable work piece locator 129 has a slot 133 formed in its bottom surface for receipt of key 131. This properly positions removable work piece locator 129. As is best seen in FIG. 4, the removable work piece locator 129 has a pair of jaw-like members 134 and 135. The jaws 134 and 135 support cylindrical contact elements 136 and 137, respectively. The contact elements 136 and 137 make line contacts with the base 124 of work piece 123, thereby properly orienting or "clocking" the work piece 123 with respect to the pallet 73 about their respective vertical axes. Once this has been done, the clamps 114, 121 and 122 may be caused to clamp the work piece base 124 by tightening the clamp bolts, such as bolt 119 in FIG. 5. Thereafter, the hydraulic arbor 98/99 may be actuated, causing the expandable sleeve 99 to bulge into clamping engagement with the inside surface of the work piece shank 126.

It will be understood by one skilled in the art that a work piece may be properly oriented on a pallet by any well known means, of which the removable work piece locator 129 is simply an example. Similarly, the work piece may be clamped to the pallet in ways other than those described above. In some instances, for example, the work piece may be provided with a solid downwardly depending cylindrical shank, rather than a hollow, downwardly depending shank such as the shank 126. In this instance, the work holding member 92 may be provided with a hollow hydraulic arbor adapted to receive the work piece shank, and having an internal sleeve hydraulically urged into engagement with the work piece shank. Where the work piece does not have a downwardly depending shank of any sort, the hydraulic arbor 98/99 will not be used. Depending on the nature of the work to be done, the hydraulic arbor 98/99 may be eliminated.

When the work piece 123 has been properly located upon and clamped to the pallet 73, the pallet 73 will be engaged with and clamped to the receiver 1.

Prior to the mating of pallet 73 and receiver 1, pressurized air is introduced through port 50 in the receiver adapter flange 2, causing piston 27 to shift to its uppermost position (against the action of springs 42) as illustrated in FIG. 2. This so locates the recesses 37 in the shank portion 28 of piston 27, that the large ball bearings 40 can be urged by O-rings 34 and 35 to their retracted positions, as shown in FIG. 2. This enables the pallet 73 to be located on the receiver 1.

As the pallet 73 and receiver 1 come into engagement, air under pressure is introduced into the bore 51 in the receiver adapter flange 2 and exits between the pallet 73 and the receiver 1 via the evenly spaced ports 59, 60 and 61 (see FIGS. 1 and 2). As the pallet 73 and receiver come together, these air blasts assure that the mating surfaces of the male polygon 25 and the female polygon 87, as well as the top surface of male polygon 25 and the corresponding surface 90a of wear ring 90 are free of chips or other foreign material which could preclude their proper mating. When initial contact is made between the male and female polygons, the pressurized air to ports 59, 60 and 61 will be shut off.

Figure 6:
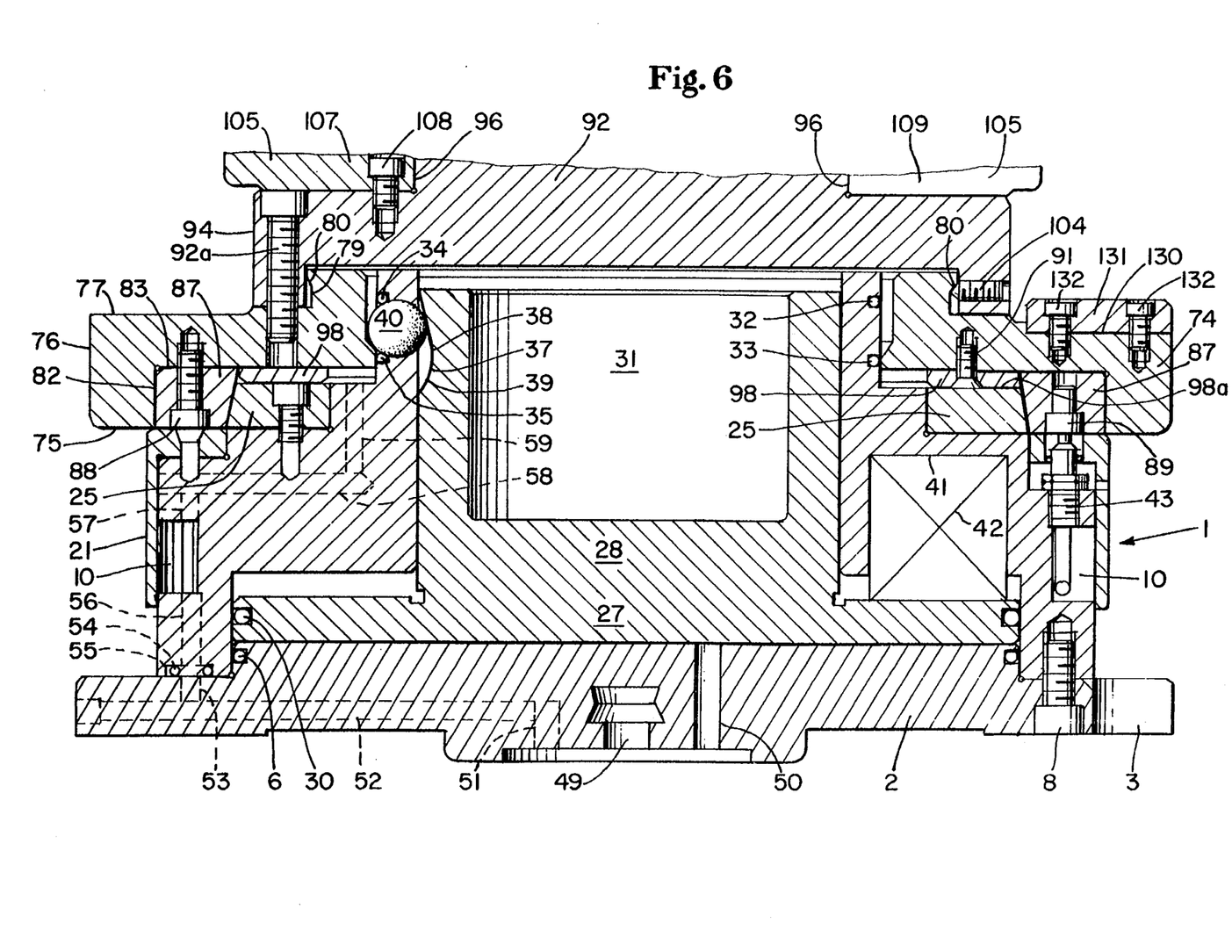
FIG. 6 is a cross sectional view of the work holding system with the pallet clamped to the receiver.

When the pallet 73 is properly engaged with the receiver 1, pressurized air to passage 50 in the receiver adapter flange 2 is discontinued. As a consequence, piston 27 of receiver 1 is shifted to its lowermost position (as shown in FIG. 6) under the influence springs 42. This action of piston 27 and the configuration of the recesses 37 in piston shank 28 cause the large ball bearings 40 to shift radially outwardly against the annular inwardly and downwardly sloping surface 85 of adapter 74 of pallet 73. Just prior to this movement of the large ball bearings 40, there may be a gap of about 0.001 inch between the opposed surfaces 63 and 90a of the male polygon 25 and the pallet wear ring 90. When the large ball bearings 40 achieve their outermost positions against the annular pallet surface 85, this gap between the opposed surfaces 63 and 90a of male polygon 25 and wear ring 90 will disappear and these surfaces will have a positive, forced, abutting engagement.

To further assure that there has been proper seating of the polygons 25 and 87 and proper abutting contact between male polygon 25 and wear ring 90, the three rest buttons mounted in the female polygon (one of which is shown at 89 in FIG. 5), contact and actuate their respective ones of switches 43, 44 and 45 mounted on the receiver (see FIGS. 1 and 2). The switches 43, 44 and 45 are connected in parallel and are normally closed. When the male polygon 27 and the female polygon 87 properly mate, when the opposing surfaces of the male polygon 25 and the wear ring 90 are properly oriented, and when the pallet is clamped to the receiver, the three rest buttons affixed to the female polygon 87 (one of which is shown at 89 in FIG. 5) will contact and open their respective switches 43, 44 and 45 and the cycle may continue. If one or more of the switches 43, 44, and 45 are not opened by their respective rest button, the current passing therethrough will shut down the machine cycle.

The mating of the male and female polygons 25 and 87 will enable repeatable clocking of within about one arc second. Mating of the polygons 25 and 87 further provide repeatable concentricity or centering within about 0.0002 inch. Mating of polygons 25 and 87, together with the mating of the opposed surfaces of the male polygon 25 and the wear ring 90 provide a repeatable flatness or parallelism within about 0.0001 inch. The provision of a replaceable wear ring 90 means that the pallet adapter 74 need not be machined to compensate for wear, and the wear ring 90 can be replaced quickly and easily, saving both time and expense. The polygons 25 and 87 have the further advantage that they can withstand high torque.

At the end of the machining cycle, the work piece 123 and pallet 73 are removed from the receiver 1. This is accomplished by introducing pressurized air into port 50, causing the piston 27 and its shank portion 28 to shift upwardly against the force of springs 42. This enables the large ball bearings 40 to be shifted to their retracted positions, and the work piece 123 and pallet 73 can be lifted from the receiver 1. Thereafter, the work piece 123 can be removed from the pallet 73 by deactivating the hydraulic arbor 98/99 (if used), and by disengaging the manual clamps 114, 121 and 122 from work piece 123.

It is within the scope of the invention to provide several pallets 73 per receiver 1. In this way, while one palletized work piece is being machined, a second work piece can be affixed to another pallet for the next machining operation. Where a rotating table is used, several pallet/receiver assemblies may be provided. When a first pallet/receiver assembly is supporting a first work piece at the machining station, a second receiver, mounted on the rotating turn table, may be located at a loading station, receiving a second palletized work piece while the first work piece is being machined.

Modifications may be made in the invention without departing from the spirit of it. For example, clamping means for clamping the pallet to the receiver, other than the large ball bearing system described, may be used. There are a number of clamping systems known in the art, such as the one taught in the abovenoted U.S. Pat. No. 4,643,410.

The horizontal, annular, abutment surface of the receiver may be a surface other than the top surface of the male polygon. The male polygon could be located in the pallet and the female polygon in the receiver, although the embodiment described is preferred. This is true because the female polygon, if located in the receiver, could provide a cavity in which chips and fines might collect. The limit switches 43 could be appropriately mounted in the pallet, with the rest pads 89 mounted in the receiver.

As used herein and in the claims, words such as "horizontal", "vertical", "upwardly", "downwardly", "upper", "lower", and the like are used in conjunction with the drawings for purpose of clarity. It will be understood by one skilled in the art that the surface to which the receiver is bolted is assumed in the foregoing description to be horizontal. This need not be the case. The surface to which the receiver is bolted could have other orientations, including a vertical orientation.

What is claimed:

1. A work piece holding system for repeatedly holding work pieces in a very precise position and orientation for operations to be performed thereon, said holding system comprising a cooperating receiver and pallet assembly, means for mounting said receiver on a suitable surface, means for mounting a properly oriented work piece on said pallet, a cooperating pair of matable male and female polygons, one of said male and female polygons being affixed to said receiver and the other of said male and female polygons being affixed to said pallet, said male polygon having a curved and sloped peripheral surface, said female polygon having a corresponding curved and sloping inner surface matable with said male polygon peripheral surface, flats formed on said peripheral surface of said male polygon at positions where said male polygon and said female polygon have initial contact during mating, said receiver and said pallet each having an axis, said receiver and said pallet each having a planar, annular abutment surface perpendicular to its respective axis, said pallet being mountable on said receiver with said annular surfaces abutted to give highly precise and repeatable flatness of said pallet with respect to said receiver so that their respective axes are parallel, and with said male and female polygons mated to give highly precise and repeatable centering of said work piece and pallet with respect to said receiver so that said pallet and receiver axes are coaxial, and to repeatably clock with high precision said work piece with respect to said axis of said receiver, and means to clamp said pallet to said receiver when said pallet is properly mounted on said receiver.

2. The work piece holding system claimed in claim 1 including means for subjecting said male and female polygon mating surfaces and said planar abutment surfaces of said receiver and pallet to pressurized air during mounting of said pallet on said receiver whereby to remove from said polygons and said abutment surfaces any foreign material which would interfere with proper mounting of said pallet on said receiver.

3. The work piece holding system claimed in claim 2 wherein one of said receiver and pallet is provided with a plurality of limit switches thereabout and the other of said receiver and pallet is provided with an equal number of switch actuating buttons, said limit switches and said buttons being so positioned that all of said buttons will actuate their respective switches only if proper flatness of said pallet with respect to said receiver is achieved, said limit switches comprise enabling switches for said machining center and all of said limit switches must be actuated by their respective button to enable said machining center.

4. The work piece holding system claimed in claim 3 wherein said male polygon is mounted in said receiver and has a planar, horizontal, annular surface comprising said receiver abutment surface, said female polygon being mounted in said pallet, a replaceable wear ring mounted in said pallet and providing said pallet abutment surface.

5. A work piece holding system for repeatedly holding work pieces in a very precise position and orientation for operations to be performed thereon, said holding system comprising a cooperating receiver and pallet assembly, means for mounting said receiver on a suitable surface, means for mounting a properly oriented work piece on said pallet, a cooperating pair of matable male and female polygons, one of said male and female polygons being affixed to said receiver and the other of said male and female polygons being affixed to said pallet, said receiver and said pallet each having an axis, said receiver and said pallet each having a planar, annular abutment surface perpendicular to its respective axis, said pallet being mountable on said receiver with said annular surfaces abutted to give highly precise and repeatable flatness of said pallet with respect to said receiver so that their respective axes are parallel, and with said male and female polygons mated to give highly precise and repeatable centering of said work piece and pallet with respect to said receiver so that said pallet and receiver axes are coaxial, and to repeatably clock with high precision said work piece with respect to said axis of said receiver, and means to clamp said pallet to said receiver when said pallet is properly mounted on said receiver, and including means for subjecting said male and female polygon mating surfaces and said planar abutment surfaces of said receiver and pallet to pressurized air during mounting of said pallet on said receiver whereby to remove from said polygons and said abutment surfaces any foreign material which would interfere with proper mounting of said pallet on said receiver.

6. A work piece holding system for repeatedly holding work pieces in a very precise position and orientation for operations to be performed thereon, said holding system comprising a cooperating receiver and pallet assembly, means for mounting said receiver on a suitable surface, means for mounting a properly oriented work piece on said pallet, a cooperating pair of matable male and female polygons, one of said male and female polygons being affixed to said receiver and the other of said male and female polygons being affixed to said pallet, said receiver and said pallet each having an axis, said receiver and said pallet each having a planar, annular abutment surface perpendicular to its respective axis, said pallet being mountable on said receiver with said annular surfaces abutted to give highly precise and repeatable flatness of said pallet with respect to said receiver so that their respective axes are parallel, and with said male and female polygons mated to give highly precise and repeatable centering of said work piece and pallet with respect to said receiver so that said pallet and receiver axes are coaxial, and to repeatably clock with high precision said work piece with respect to said axis of said receiver, and means to clamp said pallet to said receiver when said pallet is properly mounted on said receiver, one of said receiver and pallet is provided with a plurality of limit switches thereabout and the other of said receiver and pallet is provided with an equal number of switch actuating buttons, said limit switches and said buttons being so positioned that all of said buttons will actuate their respective switches only if proper flatness of said pallet with respect to said receiver is achieved, said limit switches comprising enabling switches for said operations to be performed and all of said limit switches must be actuated by their respective button to enable said operations.

7. A work piece holding system for repeatably holding work pieces in a very precise position and orientation for operations to be performed thereon, said holding system comprising a cooperating receiver and pallet assembly, means for mounting said receiver on a suitable surface, means for mounting a properly oriented work piece on said pallet, a cooperating pair of matable male and female polygons, said male polygon being mounted on said receiver and said female polygon being mounted in said pallet, said receiver and said pallet each having an axis, said receiver and said pallet each having a planar, annular abutment surface perpendicular to its respective axis, said receiver annular abutment surface comprising a planar annular surface on said male polygon, said pallet annular abutment surface comprising a replaceable wear ring mounted on said pallet, said pallet being mountable on said receiver with said annular surfaces abutted to give highly precise and repeatable flatness of said pallet with respect to said receiver so that their respective axes are parallel, and with said male and female polygons mated to give highly precise and repeatable centering of said work piece and pallet with respect to said receiver so that said pallet and receiver axes are coaxial, and to repeatably clock with high precision said work piece with respect to said axis of said receiver, and means to clamp said pallet to said receiver when said pallet is properly mounted on said receiver.

* * * * *